Patented Dec. 22, 1953

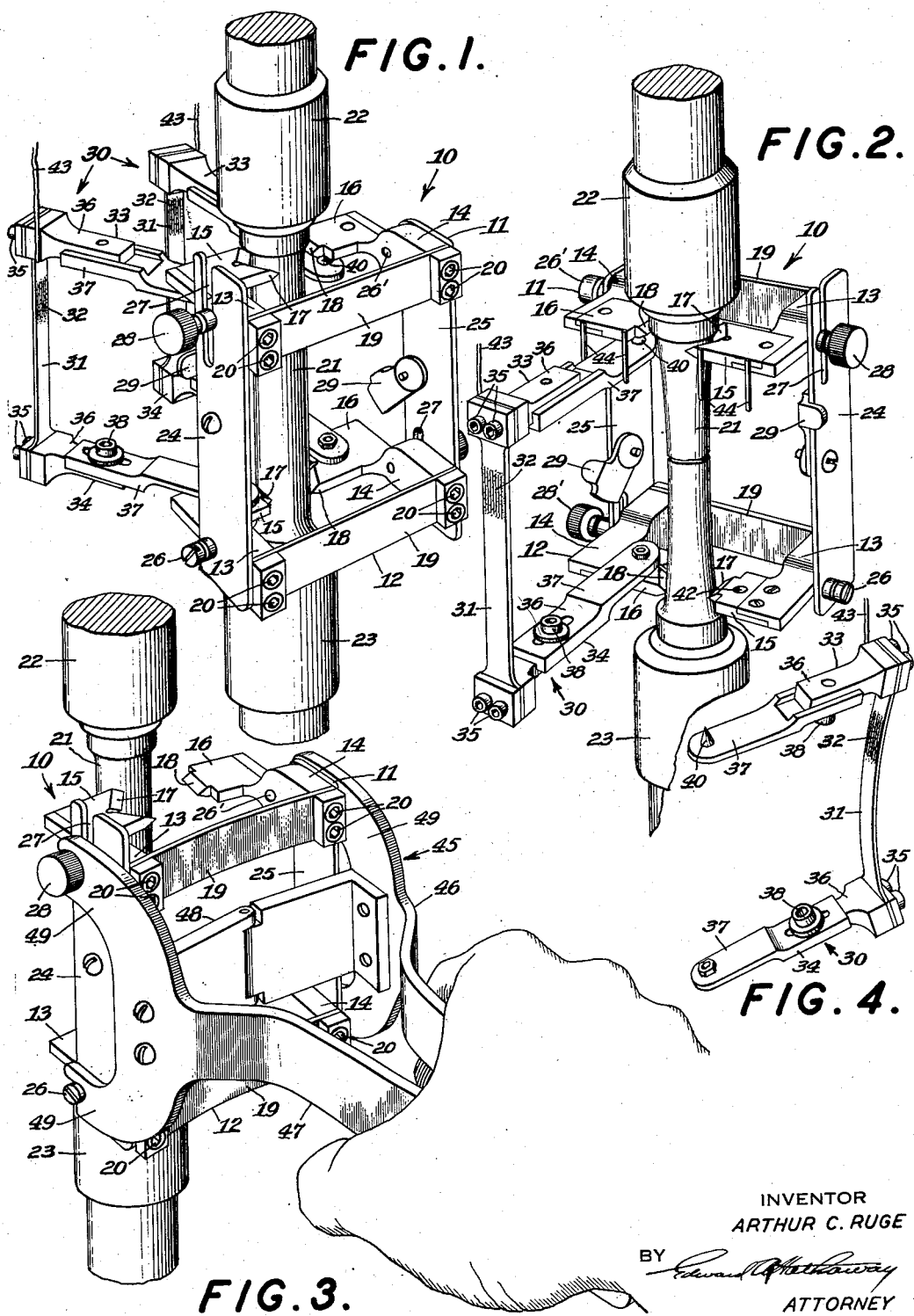

2,663,085

UNITED STATES PATENT OFFICE 2,663,085

EXTENSOMETER

Arthur C. Ruge, Cambridge, Mass., assignor to Baldwin-Lima-Hamilton Corporation, a corporation of Pennsylvania Application December 1, 1951, Serial No. 259,386

11 Claims. (Cl. 33—147)

This invention relates generally to electrical extensometers of a type employing a bending beam which flexes in response to specimen strains to be measured and on which is mounted electrical means for determining the extent of flexure.

One object of my invention is to provide an improved electrical strain sensitive bending beam type extensometer which is so constructed, arranged and operated that a comparatively small and light weight bending beam may be employed and effectively attached to a specimen in a relatively simple, expeditious and yet positive manner with minimum possibility of injury to or distortion of the beam.

Another object is to provide an improved electrical strain sensitive bending beam type extensometer in which a very positive specimen gripping action of the extensometer can be effected independently of the bending beam.

Further objects are to provide an improved electrical strain sensitive bending beam type extensometer in which bending beams of different capacities may be used in an extremely simple but effective manner for measuring either large or small strains; to provide a bending beam arrangement capable of either averaging strains in a specimen electrically or of measuring the bending strains; to provide electrical strain sensitive bending beam structure that is readily separable from the extensometer upon failure of the specimen; and to accomplish these and other objects while maintaining a high degree of sensitivity, accuracy, and stability during repetitive operations.

Other objects and advantages will be more apparent to those skilled in the art from the following description of the accompanying drawings in which:

Fig. 1 is a perspective of my extensometer viewed from the rear thereof, showing the gripping head attached to a test specimen and the disengageable clip gages mounted on the gripping head;

Fig. 2 is a perspective of the extensometer viewed from the front thereof, showing the test specimen ruptured at the end of the tension test and with one of the clip gages automatically disengaged from the gripping head upon occurrence of the rupture;

Fig. 3 is a perspective of the extensometer gripping head being held by a tool for spreading the pairs of knife edges so as to attach the gripping head to, and to remove it from, the test specimen, and Fig. 4 is a perspective of one of the clip gages removed from the extensometer.

In the particular embodiment of the invention which is disclosed herein merely for the purpose of illustrating one specific form among possible others that the invention might take in practice, I have shown in Figs. 1 and 2 a gripping frame, generally indicated at 10, comprising similar upper and lower heads 11 and 12. Hence, the description of one will suffice for both. Each head consists of a pair of parallel members 13 and 14 for supporting clip gages to be described later, and a pair of horizontal plates 15 and 16 shaped to provide a pair of specimen engaging knife edges 17 and 18 respectively, being preferably of the V and straight edge types. A flat clamping spring 19, secured by screws 20 to the rear ends of each pair of supporting members, not only holds each pair of supporting members in spaced relation but also imparts a gripping force to the pairs of knife edges 17 and 18 when they are sprung apart to be applied to a test specimen 21 held between a pair of conventional specimen holders 22 and 23 of a usual materials testing machine (not shown). The upper and lower heads 11 and 12 are vertically guided and normally supported relative to each other by vertical lateral guide plates 24 and 25, one of which is secured at one end by screws 26 to lower supporting member 13 and the other at its opposite end by screws 26' to the upper supporting member 14. The other ends of guide plates 24 and 25 are provided with longitudinal slots 27. Thumb screws 28 and 28' are threaded in members 13 and 14 and extend through said slots to releasably secure the plates to upper and lower members 13 and 14. When these thumb screws are loosened, upper and lower heads 11 and 12, carrying the pairs of knife edges 17 and 18, may be moved vertically relative to each other.

Rotatable stops 29, pivoted to the guide plates, serve, when in vertical position, to engage members 13 and 14 for quickly and accurately determining, without measurement, a predetermined gage length between the upper and lower pairs of knife edges. During operation of the extensometer, the stops are rotated out of position so that the extensometer can operate in either tension or compression.

A pair of clip gages generally indicated at 30 are each provided with sensing elements comprising a bending beam in the form of a flat spring 31, and electrical wire resistance strain gages 32 bonded in a usual manner to the broad surfaces of spring 31. In order for these beams to be rendered highly effective as to their functional characteristics and readily attachable to the extensometer heads I provide identically made but reversely positioned upper and lower supporting and bending moment arms 33 and 34 secured by screws 35 to spring 31 at the ends thereof and disposed substantially at right angles to the spring when positioned in the extensometer. For purposes of length adjustment, each arm is made in two sections 36 and 37 with overlapping ends thereof held together by a screw 38 threaded into section 36 through a lengthwise slot in section 37. For mounting the clip gages 30 on the extensometer heads 11 and 12, the outer sides of section 37 at the free ends thereof are provided with points 40 while the inner sides of knife edge plates 15 and 16 are provided with vertically aligned conical depressions 42. When the clip gages are removed from the extensometer the bending beams take the curved shape shown in Fig. 4. Hence, in mounting the gages between heads 11 and 12 the free ends of the supporting arms are moved towards each other thereby causing spring 31 to bend until points 40 can be sprung into conical depressions 42. The tension thus given spring 31 tends to spread the points and hold them engaged in depressions 42. Strain gage lead wires 43 are connected to usual indicating or recording instruments. Stops 44 formed of suitable stiff wire are rigidly pendently supported from the front edges of the upper pair of plates 15 and 16 on both sides of each upper arm 33. These stops serve to keep clip gages 30 substantially towards the front of the gripping head and away from each other to prevent entanglement when the clip gages are disengaged from the gripping frame, as hereinafter described.

*Operation.*—The gage length of the knife edges is set by first swinging members 29 vertically and compressing the upper and lower heads 11 and 12 toward each other to engage members 29, and then tightening thumb screws 28. The extensometer is now attached to the test specimen, but with the clip gages removed, by using a hand tool generally indicated at 45, Fig. 3. This tool consists of two flat substantially parallel levers 46 and 47 pivoted to each other by a hinge 48 and provided with yoke shaped arms 49 which have slotted ends to engage screws 26 and 29 on each side of the extensometer heads 11 and 12. With the yoke ends of the tool thus engaging the heads the other ends of the tool are moved together by the operator's hand as shown in Fig. 3, causing the opposed knife edges to rotate away from each other and causing clamping springs 19 to be tensioned. When the pairs of knife edges have been thus moved far enough apart, the extensometer is applied to the test specimen and the tool removed. After loosening thumb screws 28 and moving rotatable stops 29 out of position, clip gages 30 are then mounted between upper and lower heads 11 and 12 of the gripping head, in the manner described above. Elongation of the specimen when subjected to a test load causes the upper and lower heads to move vertically apart and the tension initially given bending beams 31 is proportionately reduced thus changing the resistance of the wire gages. This change in resistance is measured by suitable instruments well known in the art and the extensometer would, of course, be pre-calibrated so as to know the extent of specimen strain for given changes in resistance. When the specimen finally fails, the clip gages 30, either simultaneously or successively, may fall out of the gripping head and simply hang freely suspended by their lead wires 43 without damage. The extensometer can, of course, be removed if desired before the point of failure is reached but this is not necessary. It is also to be understood that in compression tests the clip gages do not become disengaged.

By employing the symmetrical arrangement of two bending beams shown in Fig. 1 it will be seen that I can measure the strains of the individual beams independently, from which I can readily calculate both the amount of bending to which the specimen is subjected and also the average strain. In practice, the two bending beams are connected into a single circuit so that the addition or subtraction required for such calculation is performed electrically. The circuits by which such results are obtained are well known and are not considered to be a part of the present invention.

It is seen from the above description that I have provided a relatively simple and yet highly effective bending beam type extensometer having the many desirable advantages previously mentioned as well as others.

It will, of course, be understood that various changes in details of construction and arrangement of parts may be made by those skilled in the art without departing from the spirit of the invention as set forth in the appended claims.

I claim:

1. An extensometer comprising, in combination, upper and lower substantially parallel heads, means carried by each head for gripping a test specimen and for preventing rotation of the heads relative to the specimen at their respective points of attachment to it, a bending beam disposed laterally of the specimen and extending lengthwise thereof, arms rigidly connected to the ends of the beam, said arms being disposed in planes substantially normal to the specimen axis, means for connecting the arms to said heads so that movement resulting from specimen strain in a direction lengthwise of the specimen causes the arms to effect flexure of the beam, and electrical means mounted on the beam so as to be responsive to flexure thereof as a measure of the extent of specimen strain.

2. The combination set forth in claim 1 further characterized in that each of the upper and lower heads comprises opposed specimen engaging elements and a spring member connecting the opposed elements, said spring members being offset to one side of the engaging elements so as to bias the same toward each other to exert a gripping force on a specimen when attached thereto.

3. An extensometer comprising, in combination, upper and lower heads, means carried by each head for gripping a test specimen, a bending beam disposed laterally of the specimen and extending lengthwise thereof, arms rigidly connected to the ends of the beam, said arms being disposed in planes substantially normal to the specimen axis, means for connecting the arms to said heads so that movement resulting from specimen strain in a direction lengthwise of the specimen causes the arms to effect flexure of the beam, and electrical means mounted on the beam so as to be responsive to flexure thereof as a measure of the extent of specimen strain, said means for connecting the arms to the upper and lower heads comprising abutting contacts between the arms and heads and the bending beam being prestressed so as to bias said contacts into their abutting engagement.

4. An extensometer comprising, in combination upper and lower heads, means carried by each head for gripping a test specimen, a bending beam disposed laterally of the specimen and extending lengthwise thereof, arms rigidly connected to the ends of the beam, said arms being disposed in planes substantially normal to the specimen axis, means for connecting the arms to said heads so that movement resulting from specimen strain in a direction lengthwise of the specimen causes the arms to effect flexure of the beam, and electrical means mounted on the beam so as to be responsive to flexure thereof as a measure of the extent of specimen strain, said means for connecting the arms to the upper and lower heads comprising abutting contacts between the arms and heads and the bending beam being prestressed so as to bias said contacts into their abutting engagement, said abutting contacts being on the side of said heads facing toward each other whereby, in the event of rupture of a specimen under a tension test, said abutting contacts will automatically separate and release the arms and bending beam.

5. An extensometer comprising, in combination, upper and lower heads, means carried by each head for gripping a test specimen, a bending beam disposed laterally of the specimen and extending lengthwise thereof, arms rigidly connected to the ends of the beam, said arms being disposed in planes substantially normal to the specimen axis, means for connecting the arms to said heads so that movement resulting from specimen strain in a direction lengthwise of the specimen causes the arms to effect flexure of the beam, electrical means mounted on the beam so as to be responsive to flexure thereof as a measure of the extent of specimen strain, and guides supported by one of the heads and projecting down along each side of a beam arm to limit lateral movement thereof.

6. The combination set forth in claim 1 further characterized by the provision of plates extending between upper and lower heads for connecting the same together in adjustable spaced relationship, and means supported on one of said plates for limiting movement of the upper and lower heads toward each other to determine the gage length of the extensometer.

7. The combination set forth in claim 1 further characterized by the provision of a second bending beam and arms rigidly secured thereto for connection to the upper and lower heads on the side of the specimen opposite to that of the other beam and arms, and electrical means mounted on the second beam so as to be responsive to flexure thereof as a measure of the extent of specimen strain.

8. The combination set forth in claim 1 further characterized in that the electrical means mounted on the beam comprises a bonded wire type strain gage for measuring the surface strains in the beam.

9. The combination set forth in claim 1 further characterized in that the bending beam is an elongated flat spring whose flat surface is substantially normal to the axes of the arms to which the beam is attached.

10. An extensometer comprising, in combination, a frame having upper and lower heads, opposed specimen engaging means carried by each head for gripping the test specimen and preventing rotation of the heads relative to the specimen at their respective points of attachment to it, a flat plate spring connecting the opposed specimen engaging means of one head and a similar flat spring for connecting the opposed specimen engaging means of the other head, said springs lying in a substantially common vertical plane offset to one side of the specimen engaging means and adapted to bias the opposed specimen engaging means of each head toward each other for gripping the specimen when attached thereto, and means having separable abutting engagement with said heads and being responsive to movement between said heads upon occurrence of strain in a specimen to which the extensometer is connected.

11. An extensometer comprising, in combination, upper and lower heads, means carried by each head for gripping a test specimen, a bending beam disposed laterally of the specimen and extending lengthwise thereof, arms rigidly connected to the ends of the beam, said arms being disposed in planes substantially normal to the specimen axis, means for connecting the arms to said heads so that movement resulting from specimen strain in a direction lengthwise of the specimen causes the arms to effect flexure of the beam, and electrical means mounted on the beam so as to be responsive to flexure thereof as a measure of the extent of specimen strain, the bending beam and arms therefor having provision for varying the radial length of the arms and thereby varying the sensitivity of the beam for a given strain.

ARTHUR C. RUGE.

References Cited in the file of this patent

UNITED STATES PATENTS

| Number | Name | Date |
| --- | --- | --- |
| 2,416,664 | Ruge | Feb. 25, 1947 |
| 2,588,630 | Jackman | Mar. 11, 1952 |

FOREIGN PATENTS

| Number | Country | Date |
| --- | --- | --- |
| 147,987 | Great Britain | July 23, 1920 |